(12) United States Patent
Lee

(10) Patent No.: US 6,369,401 B1
(45) Date of Patent: Apr. 9, 2002

(54) THREE-DIMENSIONAL OPTICAL VOLUME MEASUREMENT FOR OBJECTS TO BE CATEGORIZED

(75) Inventor: Dah-Jye Lee, Winchester, VA (US)

(73) Assignee: Agri-Tech, Inc., Woodstock, VA (US)

( * ) Notice: Subject to any disclaimer, the term of this patent is extended or adjusted under 35 U.S.C. 154(b) by 0 days.

(21) Appl. No.: 09/392,505

(22) Filed: Sep. 10, 1999

(51) Int. Cl.⁷ .............................................. G01B 11/10
(52) U.S. Cl. .................... 250/559.21; 356/627
(58) Field of Search ........................ 250/559.2, 559.21, 250/559.24, 559.27; 356/379, 380, 381, 384, 387, 391, 398, 623, 627, 628

(56) References Cited

U.S. PATENT DOCUMENTS 4,741,621 A * 5/1988 Taft et al. .................... 356/376
5,661,561 A * 8/1997 Wurz et al. ............ 250/559.29

* cited by examiner

*Primary Examiner*—Stephone B. Allen
(74) *Attorney, Agent, or Firm*—Foley & Lardner

(57) ABSTRACT

A three-dimensional measurement system and method for objects, such as oysters, projects one or more laser lines onto a surface on which the object is currently located. The laser lines are picked up as parallel lines by a camera where no object is located on the surface. When an object is located on the surface, the camera obtains an image that includes lines displaced from the parallel lines as a result of the lines impinging on portions of the object that have a particular height associated therewith. The displacement data allows a processor to determine the height of the object at various positions of the object can be obtained. Volume can be obtained using a binary image of the object to calculate area from the height data. The object can then be classified according to its volume.

4 Claims, 4 Drawing Sheets

THREE-DIMENSIONAL OPTICAL VOLUME MEASUREMENT FOR OBJECTS TO BE CATEGORIZED

FIELD OF THE INVENTION

The invention relates to a method and apparatus for measuring height and volume of an object. The method and apparatus of the invention finds application, in particular, to grading objects, such as oysters, by measuring the volume of the object to determine, for example, the volume of oyster meat, by a three-dimensional (3-D) optical volume measurement using multiple laser lines.

BACKGROUND OF THE INVENTION

Optical sizing systems currently available use a two-dimensional (2-D) image to measure the projected area of an oyster. The actual volume of the object is then estimated based on the 2-D image projection, in a manner known to those skilled in the art.

For example, one conventional method of determining the size of an object, such as an oyster, obtains a 2-D image of the object in order to determine its length and width at various parts of the object. That 2-D image may correspond to a particular amount of light (corresponding to an amount of current) that is picked up by pixels of a charge-coupled device (CCD) camera positioned to receive images from a particular region. Using known characteristics of the color range of an oyster relative to the color of a background surface where the oyster is subjected to light, processing circuitry can readily determine the number of pixels that correspond to the 2-D image of the object.

Once the 2-D image is obtained, the height of the object is obtained by a table lookup procedure. In order to facilitate creating a table for use in a table lookup procedure, image data from many sample objects, such as 500 oysters, is gathered. This data provides 2-D image plots with the corresponding number of pixels illuminated in each respective 2-D image plot. Next, those 500 oyster samples are weighed. With the actual weight data, a relationship between 'number of pixels in 2-D image plot of an oyster' versus 'weight of an oyster' can be obtained, using a linear regression technique, for example. When a 2-D image of a new oyster is scanned, the estimated weight of the oyster can be obtained using the equation relating 2-D image and weight, based on the data obtained from the 500 oysters in the test and setup phase. The lookup table would include a plurality of pairs of data, each of which corresponds to "weight versus number of pixels in a 2-D image".

Alternatively, the 2-D image plots of the 500 oysters can be obtained using conventional scanning techniques, and the actual volume of each oyster can be determined. One example of determining volume is putting each oyster into a vat of water having a known capacity and measuring the amount of displacement that occurs. Based on this information, a relationship between 'number of pixels in 2-D image plot of an oyster' versus 'volume of an oyster' can be obtained, using a linear regression technique, for example. When a new oyster is scanned to obtain its 2-D image, the estimated volume of the oyster can be obtained by using an equation relating 2-D image and volume, based on the data obtained from the 500 oysters in the test and setup phase. This lookup table would include a plurality of pairs of data, each of which corresponds to "volume versus number of pixels in a 2-D image".

For an object such as an oyster, the measurement accuracy of the projected area using the 2-D approach under ideal lighting conditions is approximately 0.75 $cm^2$. This measurement accuracy value is based primarily on camera resolution and field-of-view of the camera. For example, a 256×256 pixel area-scan covering a 100 cm×100 cm area will provide 0.69 $cm^2$ area accuracy. The 0.75 $cm^2$ area measurement accuracy contributes to 3.9 $cm^3$ error in volume estimation, which is an error amount determined based on comparing actual volumes with estimated volumes obtained from the 2-D approach. In the case of oysters, this error is almost 20% of the volume of a 'select' grade oyster. Lighting intensity variations, poor image quality such as glare on the oyster and the background, and background discoloration also contribute significant error to the measurement result.

Moreover, since the height or volume of the oyster is obtained by estimation techniques using similar kinds of objects, there is an inherent measurement error in the process.

As a result, conventional volume measuring approaches for objects such as oysters have significant problems and are not especially accurate.

SUMMARY OF THE INVENTION

The invention is directed to an apparatus and a method for accurately estimating a volume of an object, such as an oyster, by using a 3-D optical volume measurement.

The invention may be implemented by a method of measuring a height of a location on an object. The method includes projecting at least one line of radiation from a radiation source onto the object. The method also includes detecting at least one line of radiation reflected from said object. The method further includes comparing the at least one line of reflected radiation with radiation reflected from a reference surface to determine the height of the object at a location corresponding to where the at least one line of radiation impinges on the object.

The invention may also be implemented by a method of measuring a height of a location on an object. The method includes outputting a plurality of laser lines onto a surface area on which the object is currently located, the laser lines forming a plurality of lines on the surface area when no object is located thereon. The method also includes receiving, by a light sensitive device, such as a camera having a plurality of pixel elements that receive light from a plurality of surface locations, respectively, light reflected from the object due to the plurality of laser lines impinging on the object. The method further includes obtaining a binary image of the object based on a light intensity received at each of the plurality of pixels of the light sensitive device, the binary image being used to determine a width and a length of the object at one or more regions of the object. The method still further includes determining a distance that each of the laser lines is displaced relative to a reference location corresponding to a location that said each laser line would be received if no object was currently located in the surface area. The method also includes determining a height of the object based on the displacements previously determined. The method further includes determining the volume of the object based on the determined height, width and length of the object.

The invention may also be implemented by an apparatus for measuring height or volume of an object. The apparatus includes a laser light source that outputs a plurality of laser lines onto a surface area where the object is currently located. The laser lines form a plurality of substantially parallel lines on the surface area when no object is located thereon. The apparatus also includes an image device, such as a camera having a plurality of pixel elements that receive light from a plurality of surface locations. The imaging device receives light reflected from the object as a result of the plurality of laser lines impinging on the object. The apparatus further includes a processing unit which produces a binary image of the object based on a light intensity received at each of the plurality of pixels of the imaging device. The binary image is used to determine width and length of the object. The processing unit determines a distance that each of the laser lines is displaced relative to a reference line. The reference line is formed as a location that corresponds to a location where each laser line would be received if no object was currently located in the surface area. The processing unit determines a height of the object based on the determined distances, and volume of the object based on the determined height, width and length of the object.

BRIEF DESCRIPTION OF THE DRAWINGS

The invention will become more fully apparent from the following detailed description when read in conjunction with the accompanying drawings with like reference numerals indicating corresponding parts throughout, and wherein:

FIG. 3b shows a binary image of the projected area of the oyster of FIG. 3a;

FIG. 3c shows the curvature of the laser lines according to the invention that impinge on the oyster of FIG. 3a;

FIG. 4c shows the curvature of the laser lines according to the invention that impinge on the oyster of FIG. 4a.

DETAILED DESCRIPTION OF THE PREFERRED EMBODIMENTS

A method and apparatus according to the invention will be described in detail with reference to the accompanying drawings. The invention provides for a 3-D measurement of height and volume of objects, such as oysters, that need to be measured and categorized according to their measured sizes. Certain problems associated with optical 2-D measuring, such as those related to lighting variations, do not exist in the 3-D measuring technique according to the invention.

The 3-D approach of the invention employs an illumination source 105, such as a laser light element that produces as a beam of light having a predetermined spot size or beam waist. That beam of light is provided to a projector (internal to the laser light source 105, not shown), which converts the light beam or spot beam into a scan line. The scan line is converted by optics (internal to the laser light source 105, not shown), which optically duplicates the line into a plurality of parallel lines, which are then output from the laser light source 105. Such a laser light source can be obtained as an off-the-shelf component, such as Model # SNF-501L, made by Lasiris, Inc., which can output up to 99 parallel lines from a single source. This device operates at 675.4 nanometers output wavelength, with a laser power of 25.10 mW. Alternatively, an illumination source that outputs a beam of energy scanned in a raster-like manner can provide the effect of the plurality of beams. Those of ordinary skill in the art will recognize that other wavelengths and power levels can be used as the illumination source.

Figure 1A:
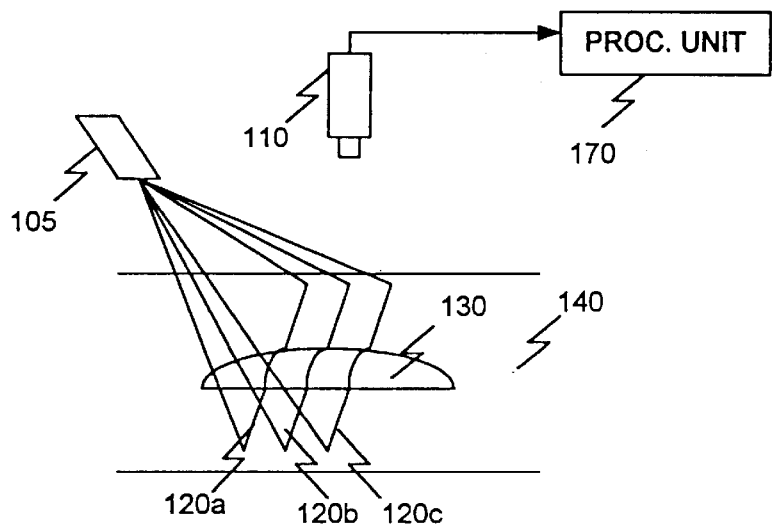
FIG. 1a is a block diagram of a 3-D triangulation system according to the invention.

By way of example, FIG. 1a shows a system according to the invention, with a laser light source 105, a flat surface such as a conveyor 140, an image detector such as camera 110, and a processing unit 170 that processes data received from the camera 110. Laser light source 105 emits a plurality of laser lines 120a, 120b, 120c onto an area of the conveyor 140 at which an object, such as oyster 130, is to be measured. The surface area from which light is received by the camera 105 is shown as a particular region of the top surface of the conveyor 140, but it may alternatively correspond to any flat surface on which an object is to be measured. An advantage of the present invention over conventional 2-D approaches is that the object size is actually measured rather than estimated as obtained from a 2-D image projection.

As an optional component, an interference filter, such as a bandpass filter tuned to the output frequency of the laser light source, may be used in the present invention to reject or filter the ambient light and thereby only pass light to the camera 110 at the same wavelength as output by the laser. Such a filter is not shown in FIG. 1a, but would be provided between the surface area that is imaged and the camera 110.

In FIG. 1a, the laser lines 120a, 120b, 120c projected on the flat surface of the conveyor belt 140 are straight lines. These straight lines appear as curved lines when projected onto an object having height. The use of the curved lines to compute the volume of the object is explained with reference to FIG. 1b. When projected onto an object, a third dimension that corresponds to height is calculated based on the laser projection angle and the displacement on the image.

For example, for a first object 155, the displacement (d) is shown relative to the straight line 156 that would have been received by the camera 110 if no object was currently in the surface area of the conveyor 140. The height (h) of the first object 155 is calculated from the displacement (d). When projected on a second object larger than the first object, such as object 160, the third dimension (H) is calculated from the larger displacement (D). The larger the height or thickness, the larger the displacement that will be shown on the image picked up by the camera 110. Preferably, camera 110 is a CCD camera, but other types of image pickup devices may be utilized for camera 110.

The relationship between line displacement and object height depends on the angle of illumination. For example, if the laser light source 105 is positioned so as to output light at 45 degrees with respect to the surface area 140, and if the camera 110 is positioned directly above (at a 90 degree angle) the surface area to be imaged, then a line with no displacement indicates zero height. A line that is picked up by the camera and indicates a displacement of 1" from its reference position corresponds to an object height of 1". Those of ordinary skill in the art will recognize that different angular relationships between the illumination source 105 and surface 140 will result in different relationships between object height and line displacement.

Figure 3A:
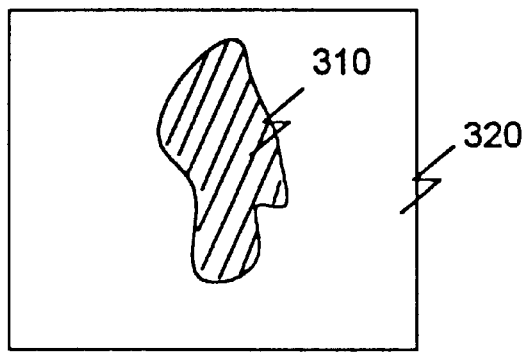
FIG. 3a shows an original image of an oyster to be sized according to the invention.
Figure 3B:
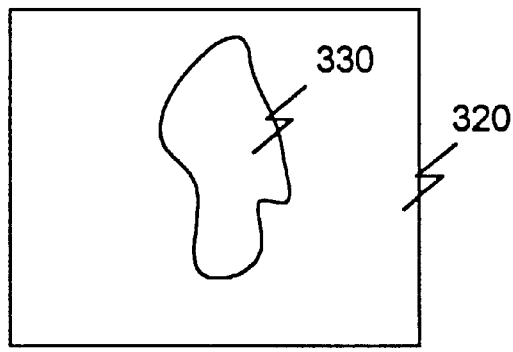
Figure 3C:
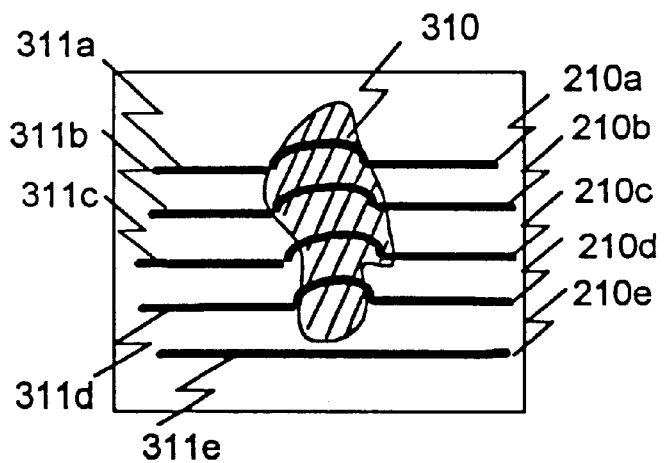

By determining the displacement of the line caused by the height of the object at various locations along the object, for example, five separate locations spaced equally apart for each of the five lines that intersect the object in FIG. 3c, then 25 separate displacements and thereby 25 separate height values are obtained for the object. By using the 2-D image of the object (obtained, for example, by conventional methods explained earlier) in order to obtain the length and width coordinates of the object, a 3-D plot of the object, and thereby a volume of the object, can be obtained.

Figure 1B:
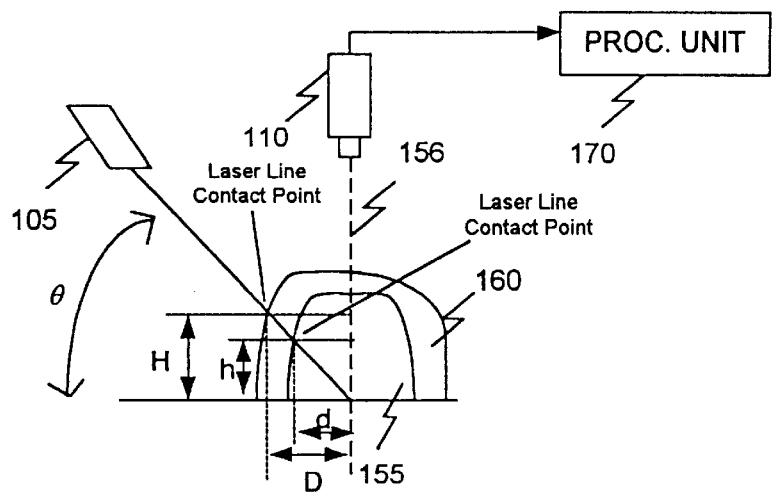
FIG. 1b is a side view of the 3-D triangulation system according to the invention, showing the laser line contact with the surface of a large-sized and a small-sized object.
Figure 2:
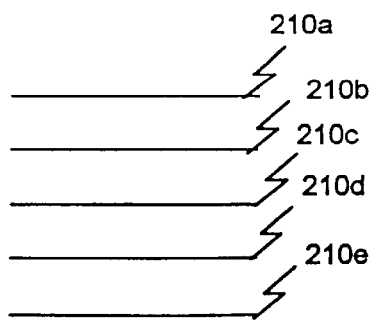
FIG. 2 shows laser lines on a flat surface according to the invention.

FIG. 2 shows the image of five laser lines projecting at an angle relative to the flat surface 140 when an object is present, when, as shown in FIGS. 1a and 1b the emitted laser energy obliquely strikes the surface area to be illuminated. For example, the angle may be 45 degrees, but any other angle value except the angle at which the camera 110 is positioned may suffice while remaining within the scope of the invention. In FIG. 2, all of the lines 210a, 210b, 210c, 210d, 210e are shown as straight lines because of the flatness of the surface.

According to the invention, the displacement of the laser lines from these 'straight line' positions is used in the present invention to calculate the height of the object. For example, as explained above, when the laser light source 105 is positioned at a 45 degree angle with respect to the surface area to be illuminated and imaged, and when the camera 110 is positioned at a 90 degree angle with respect to the surface area, a 1" displacement of a laser line at a particular point (as determined by received light from a pixel or group of pixels of the camera 110) from its reference position (where no object is in the surface area to be imaged) corresponds to a 1" height at that particular point.

An alternative to determining the displacement based solely on the geometric positioning of the laser light source 105 and the camera 110 with respect to the surface area to be illuminated and imaged employs a test object. Placing a test object with a known height on the surface provides a more accurate volume measuring system and method. Displacement of the laser lines can be measured to determine the height. Any difference between that measured height and the actual height of the object can be used to calibrate the apparatus, so as to correct for any errors such as non-exact positioning of the various elements. For example, if the displacement of a laser line illuminating a test object indicates a 1⅛" height, but the test object has a 1" actual height only, then future measurements will be offset by subtracting ⅛" from the estimated height as determined by the 3-D volume estimation method and apparatus.

By way of example and not limitation, FIG. 3a shows the original image of an oyster 310 with the same background surface as that in FIG. 2. Ideally, the background surface has a color that has a much different reflectivity than the object to be measured. For example, if the object to be measured is substantially black, then the background surface should be substantially white or totally white, or vice versa. In FIG. 3a, the oyster 310 appears darker than the background in FIG. 2, and is shown as occupying a hatched region in the figure. Because of the contrast between the oyster 310 and background area 320, a binary image 330, shown in FIG. 3b, can be obtained to calculate the (2-D) area of the oyster. Obtaining a binary image based on differences in contrast of an image picked up by a camera is well known to those skilled in the art, and will not be explained herein in order to provide a concise explanation of the invention.

The oyster length and width can be measured based on the projected binary image 330 of FIG. 3b. However, the size of the binary image depends heavily on the threshold selected for the pixels of the camera 105 (e.g., the threshold value of current received by a pixel that is used to categorize the surface area covered by the pixel as either white or black, or something in-between), where such a threshold is very sensitive to lighting variations such as variations in ambient light. Thus, the choice of a proper threshold is important to obtain an accurate binary image.

FIG. 3c shows the oyster 310 with the laser lines 210a, 210b, 210c, 210d, 210e according to the invention projected thereon. The curvature of each of the laser lines 210a, 210b, 210c, 210d, 210e indicates the thickness of the oyster 310 at the particular location of the oyster where the respective laser line makes contact with the oyster 310. The thicker the oyster, the more the lines over the oyster shift away or are displaced from the reference straight line of FIG. 2 or the portions 311a through 311e of lines 210a through 210e. The precision achieved is a function of the number of laser lines used. Higher precision measurement can be achieved by using more laser lines. Care should be taken to avoid using too many laser lines that the displaced laser lines run into each other, thereby making height measurement difficult if not impossible. In such cases, it would be necessary to correlate the references and the displaced lines. For example, FIG. 2 and FIG. 3c show five laser lines that cover approximately a 4" wide region. The use of six or more laser lines in this same region would provide a more accurate measurement of the volume of an object to be measured in that region. In contrast, using a single laser line will allow determining the height of the object at locations corresponding to where that line impinges on the object. Extremely high precision measurement could be achieved with a raster type scan by measuring the displacement of different lines during several raster scans. For example, displacements for the set of lines could be measured in a first scan of displacements in an interlaced set of lines in a second scan (e.g., first scan uses lines 210a, 210c, 210e, second scan uses lines 210b, 210d of FIG. 2).

Figure 4A:
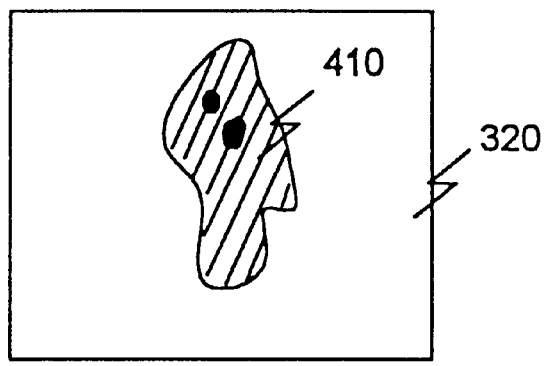
FIG. 4a shows an original image of another oyster that has several high reflecting spots and that is to be sized according to the invention.
Figure 4B:
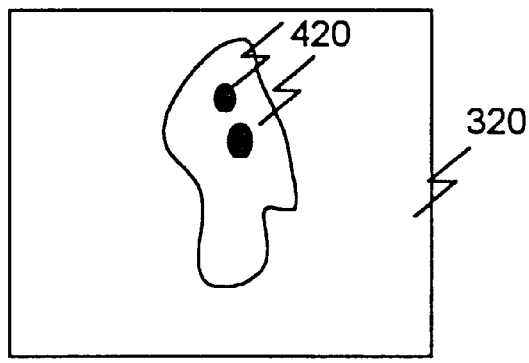
FIG. 4b shows a binary image of the projected area of the oyster of FIG. 4a, where the high reflecting spots appear as dark spots on the white image of the oyster.
Figure 4C:
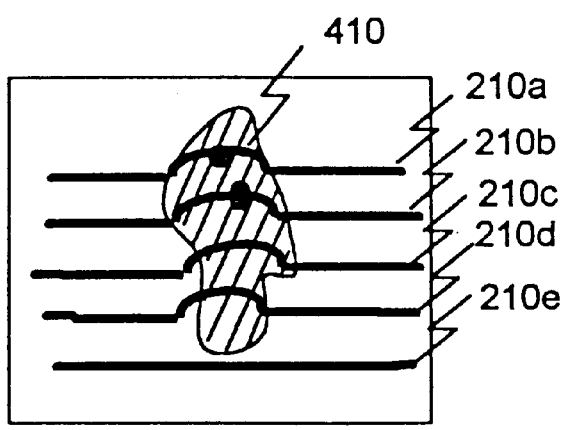

FIG. 4a shows an oyster 410 that has several spots of high reflectivity, which typically correspond to small areas of the oyster having a brighter color than other areas of the oyster. Another potential source for some or all of the high reflectivity spots is scattered ambient light. The binary image of the oyster 410 is shown in FIG. 4b, where the few bright spots and noisy background appear as black spots 420. The black spots and any noisy background contribute to measurement inaccuracy. FIG. 4c shows the oyster 410 being measured on the laser lines in accordance with the invention. In FIG. 4c, a height measurement is accurately performed regardless of the bright spots on the binary image, and a volume measurement can be obtained from the height measurement and the 2-D optical image. The accuracy of the 3-D optical volume measurement method and apparatus of the present invention is estimated to be around 0.2 cm$^3$. This accuracy estimate is based on the use of 512×480 pixel area-scan camera covering a 10 cm×10 cm scan area, and of course other accuracy estimates may be obtained using different sized cameras and scan areas. More laser projection lines and use of a sub-pixel processing algorithm will improve the accuracy even further.

In more detail, a sub-pixel algorithm can be used to calculate the displacement of each laser line. For example, 10 cm/512 pixels≈0.02 cm/pixel. If a light incidence angle of 45 degrees and a light reception angle of 90 degrees are used as described above, then one pixel displacement is equivalent to 0.02 cm in displacement and also 0.02 cm in height. With the use of a sub-pixel algorithm, the displacement can be calculated with accuracy smaller than an integer pixel. If the sub-pixel algorithm can provide a ⅕ of a pixel accuracy, then the height accuracy would be 0.02/5=0.004 cm.

Figure 5A:
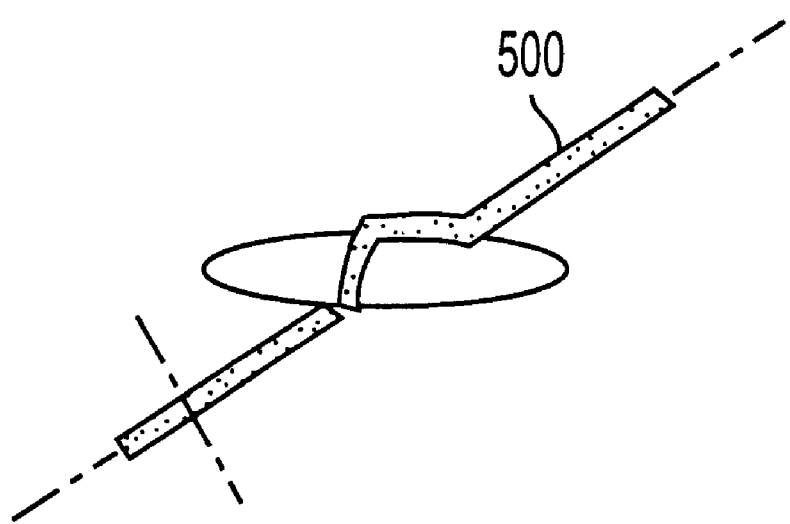
FIGS. 5a and 5b are diagrams in which a sub-pixel algorithm may be used to obtain even greater accuracy.
Figure 5B:
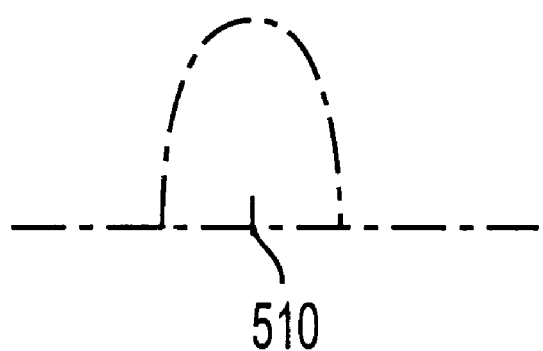

A laser line projected onto the object is typically more than one pixel thick, and normally is about 5 to 10 pixels thick. The displacement in that instance can be calculated based on the center 510 of the laser line 500, as shown in FIGS. 5a and 5b, where the center corresponds to a pixel with the highest received light energy.

A processing unit 170, such as a CPU or the like, receives the raw image data from the camera 110. From that image data, the processing unit 170 determines the binary image of the projected area to determine its length and width. The processing unit 170 also uses the laser line displacement data to determine the height of the object at various locations of the object. Using this data, the processing unit 170 calculates the volume of the object.

While preferred embodiments have been described herein, modification of the described embodiments may become apparent to those of ordinary skill in the art, following the teachings of the invention, without departing from the spirit and scope of the invention as set forth in the appended claims. For example, while the present invention has been described with reference to measuring the volume of oysters, it may be applied to measuring other types of objects, such as agricultural products. For example, corn, apples, and the like may be measured by using the 3-D method and apparatus of the invention. While not shown specifically in FIGS. 1a and 1b, the laser light source 105 may also be controlled by the processing unit 170, which may be a microprocessor, for example. Further, while the present invention has been described with reference to a flat surface area on which the object is to be imaged, non-flat surface areas may also be utilized, provided that the reference lines are obtained from the non-flat surface areas so as to provide non-linear reference lines for comparison with displaced lines occurring when an object is placed onto the non-flat surface area and imaged. While the present invention has been described based on the use of parallel laser lines, other types of laser output patterns, such as concentric circles or a matrix of vertical and horizontal lines, may alternatively be used.

What is claimed is:

1. A method of measuring a height of a location on an object, comprising:

projecting at least one line of radiation onto the object;

detecting at least one line of radiation reflected from the object; and comparing the at least one line of reflected radiation with radiation reflected from a reference surface to determine the height of the object at a location corresponding to where the at least one line of radiation impinges on the object, wherein the at least one line of radiation is projected in a direction along a first angle with respect to the object, and wherein the at least one line of reflected radiation is detected along a direction corresponding to a second angle different from the first angle.

2. An apparatus for measuring a height of a location on an object, comprising:

an illumination source configured to output at least one line of radiation onto the object;

a detector configured to detect at least one line of radiation reflected from the object; and a processing unit configured to process information corresponding to the at least one line of reflected radiation with information corresponding to radiation reflected from a reference surface to determine the height of the object at a location corresponding to where the at least one line of radiation impinges on the object, wherein the at least one line of radiation is projected in a direction along a first angle with respect to the object, and wherein the at least one line of reflected radiation is detected along a direction corresponding to a second angle with respect to object.

3. A method of measuring a height of a location on an object, comprising:

projecting at least one line of radiation from a radiation source onto the object;

detecting at least one line of radiation reflected from the object; and comparing the at least one line of reflected radiation with radiation reflected from a reference surface to determine the height of the object at a location corresponding to where the at least one line of radiation impinges on the object, wherein the at least one line of radiation is projected in a direction along a first angle with respect to the object, and wherein the at least one line of reflected radiation is detected along a direction corresponding to a second angle with respect to object.

4. An apparatus for measuring a volume of an object, comprising:

a laser light source configured to output a plurality of laser lines onto a surface area on which the object is currently located, the laser lines forming a plurality of parallel lines on the surface area where no object is located thereon;

a camera having a plurality of pixel elements that receive light from a plurality of surface locations, respectively, the camera configured to receive light reflected off the object due to the plurality of laser lines impinging on the object; and a processing unit configured to obtain a binary image of the object based on a light intensity received at each of the plurality of pixels of the camera, the binary image being used to determine a width and a length of the object;

the processing unit configured to determine a distance that each of the laser lines is displaced relative to a reference location corresponding to a location that said each laser line would be received if no object was currently located in the surface area, the processing unit configured to determine a height of the object based on the determined distances, and the processing unit configured to determine a volume of the object based on the determined height, width and length of the object, wherein the laser light source is positioned at a first angle with respect to the surface area, and wherein the camera is positioned at a second angle with respect to the surface area that is different from the first area.

* * * * *